US005437084A

United States Patent [19]

Woolery

[11] Patent Number: 5,437,084

[45] Date of Patent: Aug. 1, 1995

[54] ASSEMBLY TOOL FOR MODULAR FLOTATION PLATFORM SECTIONS

[76] Inventor: Stephen C. Woolery, 1003 Belleville St., Lebanon, Ill. 62254

[21] Appl. No.: 10,031

[22] Filed: Jan. 27, 1993

[51] Int. Cl.[6] .......... B23P 19/04

[52] U.S. Cl. .......... 29/238; 29/267; 254/113; 254/131

[58] Field of Search .......... 24/68 CT, 68 CD, 273; 254/243, 113–119, 131; 29/267, 239, 238

[56] References Cited

U.S. PATENT DOCUMENTS

| | | | |
|---|---|---|---|
| 817,665 | 4/1906 | Poynton | 24/68 CT |
| 1,008,503 | 11/1911 | Wahlgren | 24/273 |
| 1,460,235 | 6/1923 | Fischer | 24/68 CT |
| 1,991,150 | 2/1935 | Hammon | 29/238 |
| 2,759,235 | 8/1956 | Rea | 24/68 CT |

OTHER PUBLICATIONS

U.S. Navy Container-Size Pontoons Demonstration Report, Report ATC-253901-5, Prepared by Aerojet TechSystems Company, Oct. 1984, p. 34.

*Primary Examiner*—Robert C. Watson

*Attorney, Agent, or Firm*—John H. Lamming; Arthur H. Tischer; Anthony T. Lane

[57] ABSTRACT

A tool for aligning modular flotation platform sections is lightweight and portable. Its principal components are a fulcrum lever arm, a link rod, and two adapters for gripping coupling means on adjacent flotation platforms. The fulcrum lever arm has a handle portion and a slotted head portion. The link rod is secured at one end in the slotted head portion by means which enable it to move pivotally and translationally in the slots. To the other end of the link rod and the end of the head portion of the fulcrum lever arm are secured the two gripping adapters. They are secured in such a way that they may pivot on the securing means. The adapters may be fabricated to mate with standard coupling means with which standardized flotation platform components are typically equipped.

15 Claims, 6 Drawing Sheets

ASSEMBLY TOOL FOR MODULAR FLOTATION PLATFORM SECTIONS

The U.S. Government has a paid-up, irrevocable, royalty free, worldwide license to practice, or have practice on its behalf, the invention claimed herein.

BACKGROUND OF THE INVENTION

This invention relates generally to modular flotation components which may be assembled into useful structures. More specifically, this invention relates to a tool for manually pulling modular flotation platform (MFP) sections into alignment and holding them in that position until they can be joined securely by other means. The tool of the invention may be used to assemble MFP systems having a wide variety of uses in a number of different settings.

MFP sections currently have many uses. They may be used in civil or military applications for the field assembly of portable bridges or causeways, for temporary harbor facilities, or as working platforms (for pile drivers or cranes, for example). They may be used on construction projects in a primarily aquatic environment, either as temporary structures or buildings, or as working platforms used in constructing or assembling other structures.

Various tools and devices are exemplary of the related art. These are shown in U.S. Pat. Nos. 3,640,238, Stockdale; 4,763,393, Gee; 4,493,139, McClure; 4,519,122, Miller; and 4,598,452, Iseki.

The patent to Stockdale discloses a hydraulically operated machine for pulling buoyant hull sections into alignment. This machine employs a pair of extendable and retractible arms pivotally anchored at their lower ends to the deck of one hull section, articulated with a duplex arm structure mounted on a shaft, fluid cylinders capable of pivoting the duplex arm, and gripping means to engage an anchor point mounted on the deck of a second hull section. The machine may be operated by remote control, if required, and is demountable.

The other cited patents do not deal specifically with floating hulls or platforms, but have nonetheless been cited because they generally disclose tools which use mechanical leverage to bring initially unconnected members into alignment for fastening by means independent of the tool. The patents to McClure and Iseki disclose generally similar tools for connecting boiler pipes by use of gripping means engaged with the tubular sections to be connected and a pivotally operable handle arm which moves as a lever to align the sections. The patent to Gee discloses a tool for drawing and clamping two sheet metal sections of duct work together. This device uses a lever handle pivotally mounted to wheels, rotatably secured to sheet metal gripping flanges. Pivotal movement of the lever handle brings the unconnected sheet metal duct sections into substantial coplanar alignment for securing by a cleat. The patent to Miller discloses a tool for pulling sections of heavy pipe, such as those used in pipelines, into alignment. A long handle which operates as a lever is pivotally mounted to one yoke gripping means and is attached by linkages to another so that pivotal movement of the handle will bring unconnected sections of pipe into alignment.

The objects and advantages of the invention will be apparent from the summary, description and claims set forth immediately below together with the accompanying drawings.

SUMMARY OF THE INVENTION

The present invention has several primary objects. One primary object is to provide a strong, yet lightweight and easily portable tool which is useful for drawing MFP sections together to be bound or secured by other means in the assembly of useful structures. Another object of the invention is to provide a tool that enables relatively few people to assemble a useful structure comprised of MFP sections; the tool provides a mechanical advantage to its operator which augments the manual force supplied by the operator, making the assembly task more manageable and less stressful than assembly with other manual means. Still another primary object of the invention is to provide a tool that has gripping means that fit or mate with standard coupling means on MFP components so that the tool will have a wide application. In furtherance of this latter objective, it is a related primary object to provide a tool wherein the gripping means are easily interchanged with alternative gripping means elements so that if non-standard items are encountered, the tool may be made to adapt to them. It is also among the primary objects of the invention to provide a tool that is relatively inexpensive to fabricate, easy to assemble, and that is easy to maintain while typically requiring little or no maintenance.

In meeting these and other related objects, there is provided in this invention a tool which is comprised of a fulcrum lever arm having a handle portion and a head portion, a link rod, two gripping means, and means for securing the link rod and gripping means in place. The head portion of the fulcrum lever arm has slot means which enable one end of the link rod to be secured therein while permitting pivotal movement of the rod around its securing means and translational movement of the link rod within the slot means. The gripping means are secured in their respective places, at the free end of the link rod and at the end of the head portion of the fulcrum lever arm, so that they may move pivotally on their respective securing means. In a preferred embodiment of the invention, the gripping means are fabricated to mate with standard coupling means, such as corner slots, with which standardized MFP components are typically equipped, and the slot means include means to enable the tool to be locked in its closed position.

THE PREFERRED EMBODIMENT

Figures 1, 1A:
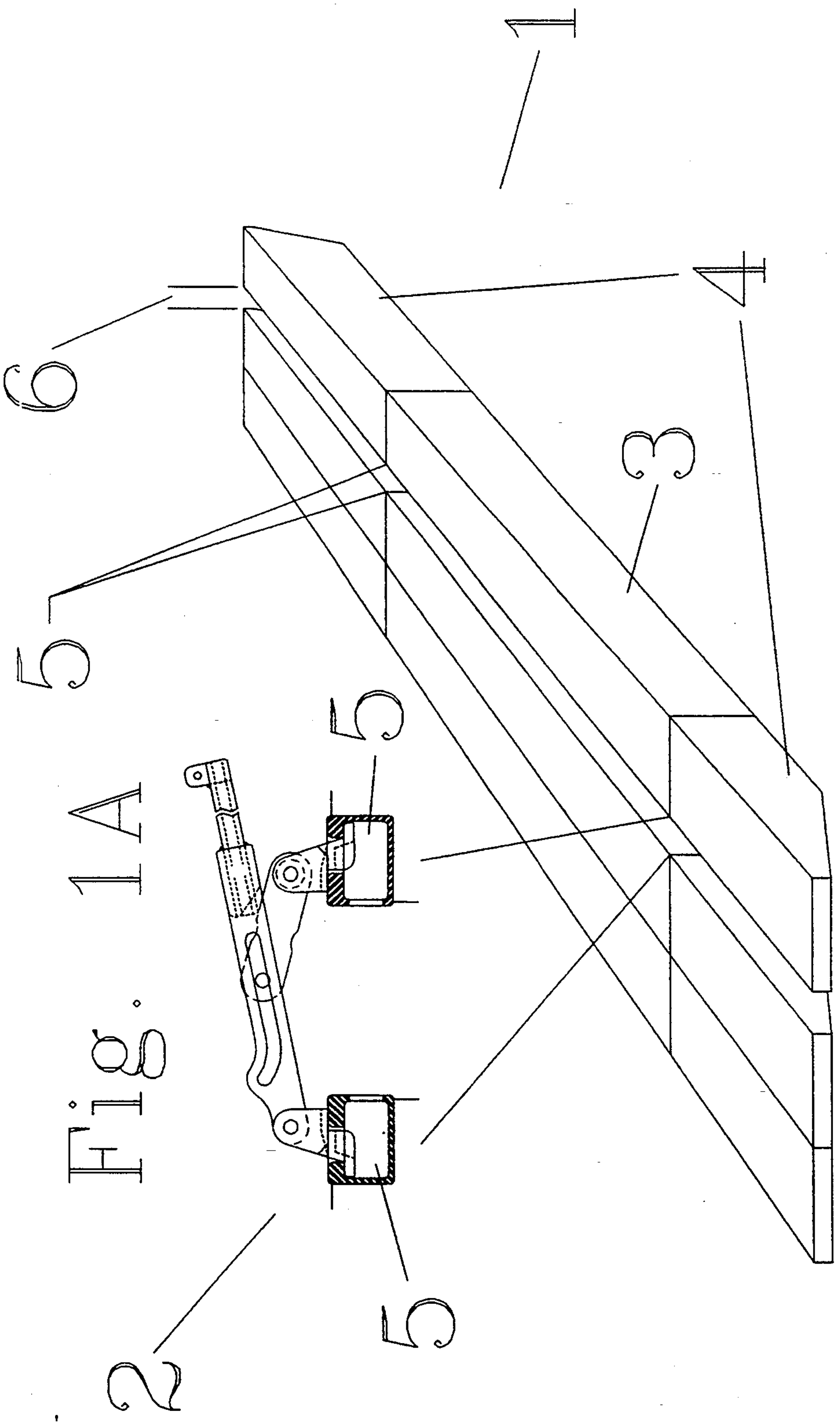
FIG. 1 shows the spatial relationship between the assembly tool of the invention and MFP sections to be assembled.

The assembly tool of the invention is used to draw MFP sections of an incipient structure into alignment so that they may be secured, fastened or locked in place. Assembly will normally be done in the floating mode, but assembly may also be assisted with the tool of the invention in the dry mode. "Floating mode" denotes a mode in which MFP sections are in an aquatic environment, in water of sufficient depth for the components (or the entire collective structure) to have buoyancy therefrom. "Dry mode" denotes a mode in which there is no fluid medium to impart buoyancy to the MFP sections in either individual or collective conformation; shoreside or the deck of a ship are examples of the dry mode. It is also possible to assemble MPF sections in a "hybrid" mode wherein a portion of a platform is floating free and a portion is aground; the tool of the invention would also be useful in such an instance. Assembly in the floating mode is preferred, though either mode (or a "hybrid" mode) is possible and permissible with the tool as hereinafter described.

Various terms are often applied to individual modular components and the collective structures they form. Terms such as "component", "module", or "unit" connote a single, unitary member. As used herein, the term "MFP system" is intended broadly to represent an entire assembled structure or a significant sub-assembly of one, either one comprising multiple individual components which are joined together by fastening, securing or locking means. The term "MFP section" is intended herein to represent both singular or aggregated plural MFP components. Accordingly, any general description of the drawing together of two MFP sections would subsume the following types of assembly operations: (1) drawing together two individual components; (2) drawing together an individual component and an aggregation of multiple joined components; and (3) drawing together two aggregations of multiple joined components. Thus, while the intended meaning herein of "MFP system" is generally wider (and it is largely used in a generic sense) than that of "MFP section", it will be appreciated that the terms may be synonymous when the latter term is taken in a broad sense.

In the present state of the art pertaining to the on-site assembly of MFP sections, assemblers generally use ropes to draw the MFP sections into sufficient proximity to enable some assemblers to hold the proximate sections together with pry bars while other assemblers use means typically built into the MFP sections to bind, fasten or lock the sections together. This technique requires a fairly large number of personnel and a high level of exertion on the part of each. Additionally, the holding power of ropes and pry bars is not great and may not prove reliable, further complicating the job.

FIG. 1 gives an overview of the manner in which an assembly tool 2 of the invention would be used with the kind of MFP sections depicted. These MFP sections form a structure with the assembly of end units 4, which have canted ends, and a larger middle section 3. A desired structure may be comprised of a multiplicity of these three-unit groups put together end-to-end or side-by-side, or in some combination thereof. The MFP units 3 and 4 are fitted with corner slots 5 or similar coupling means which can receive gripping means (such as an adapter 19, depicted in FIGS. 1 through 6) for securing the the tool in gripping engagement to each of two neighboring MFP sections, so that leverage may be applied to bring the sections together. The corner slots will typically be standardized according to an International Standards Organization (ISO) model configuration. In this manner, the adapter 19 can be designed and fabricated to mate with ISO standard corner slots 5 to eliminate any need for interchanging parts during assembly of an MFP system. The gap 6 between neighboring sections should not exceed about 1.5 feet for the typically sized tool of the invention; ropes or other means may be used if necessary to draw MFP sections close enough together to reduce the gap to a suitable interval. While only one tool is shown in FIG. 1, it is generally preferred that the tools of the invention be used in pairs. They may be used in greater numbers where required. The tools will be placed in positions which are separated by intervals suitable to the length, size and mass of the sections to be brought together and the number of tools being employed.

The modular units shown in FIG. 1 (3 and 4) represent MFP units known in the related art which have dimensions that meet ISO specifications and may have securing (locking) means such as those disclosed in U.S. Pat. Nos. 4,610,215; 4,695,184; and 4,811,681. It is believed that current trends in the related art strongly favor standardization of MFP unit dimensions and corner slots. While such a trend would expand the usefulness and utility of the assembly tool of the invention, the tool will work on a variety of different kinds of MFP sections, whether these meet IS0 specifications or not. As noted above, the MFP sections are desirably equipped with IS0 standard corner slots 5 so as to avoid a poor fit of the tool and the corner slot, or the need to interchange parts during an assembly operation. Therefore, while the tool of the invention is adaptable to non-standardized MFP corner slots, it will be appreciated that the tool will have its widest and most efficient application to MFP sections equipped with IS0 standard corner slots. These considerations are implicit in the following descriptions of the composition and use of the assembly tool.

The composition and use of the tool 2 of the invention will now be described in detail in relation to FIGS. 2 through 5. The principal components of the tool are the fulcrum lever arm 11, the adapter 19, and the link rod 17; pin means 13, 15, 18 and 20 secure the principal components in place. Adapters 19 are designed to grip a portion of each of two neighboring MFP sections; the adapter 19 will normally grip the corner slot 5 coupling means portion of an MFP component. The adapter 19 shown in the drawings is designed to mate with an ISO standard corner slot; it is equipped with a flanged end 25 which locks in place inside the corner slot 5 (see FIG. 6, for example) due to the resultant force applied when the lever arm 11 is moved from its open position toward its closed or locked position (from position of FIG. 2 to position of FIG. 3, respectively). The adapters 19 may be interchanged on any given assemble 17 tool 2 with relative ease in case the corner slot configuration should vary from one set of MFP components to another. The principal components of the tool will typically be fabricated of steel alloys; the parts may typically be cast or machined.

Figures 4A, 4B, 4C, 4D:
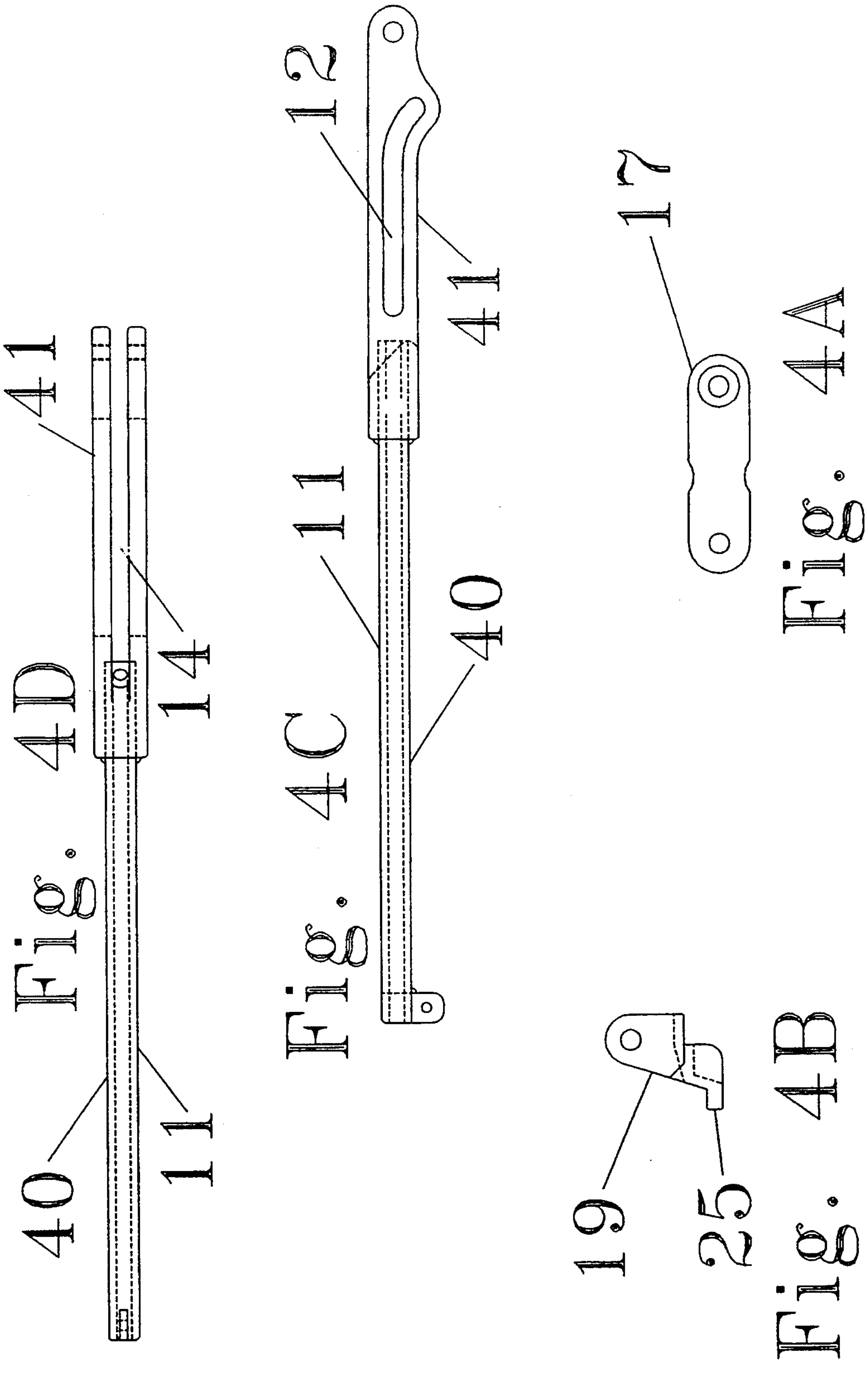
FIG. 4 is an exploded view of the principal components of the assembly tool off, he invention, showing side and bottom perspective of the fulcrum lever arm and the slot means therein.
Figure 5:
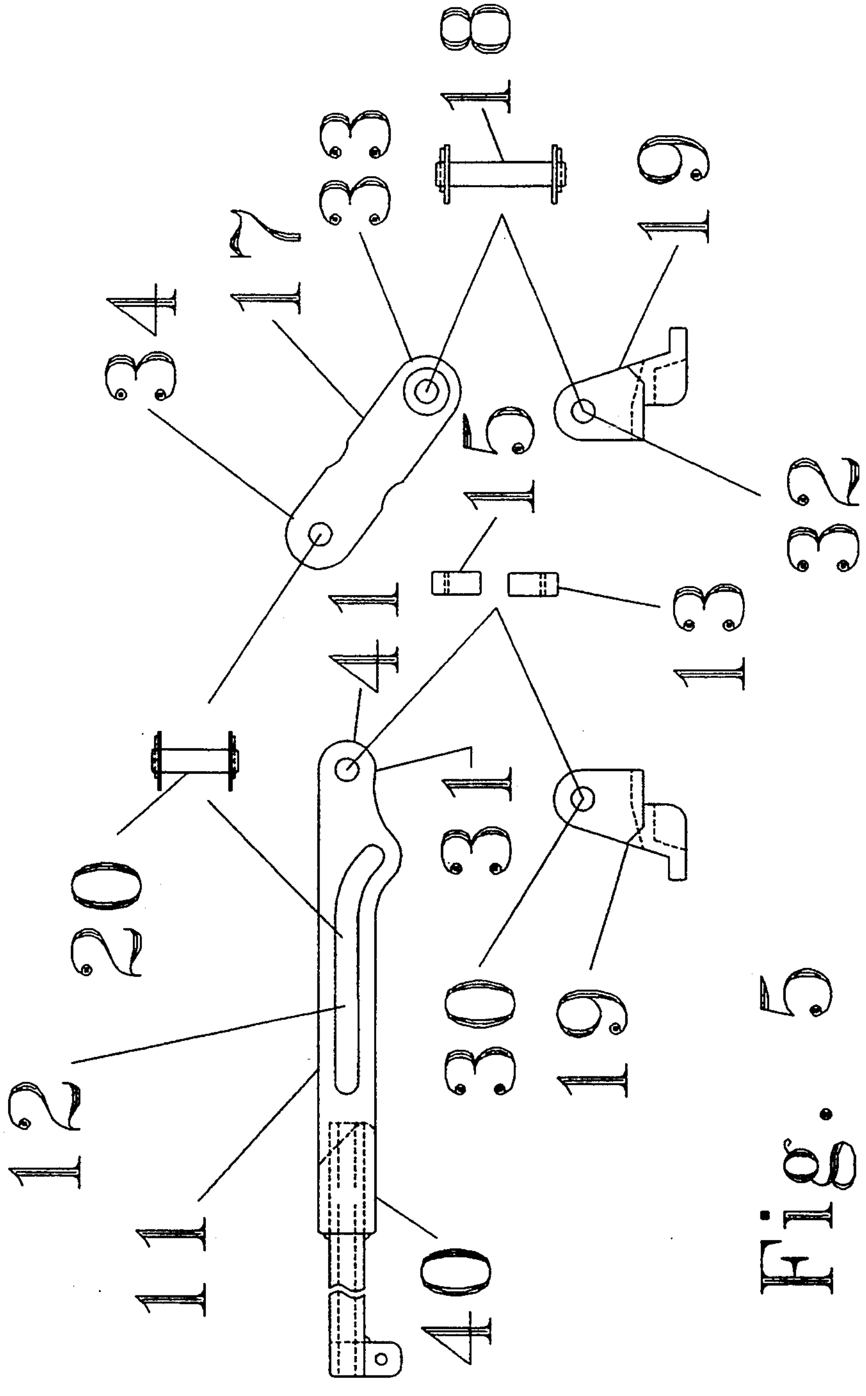
FIG. 5 is also an exploded view of the principal components of the assembly tool of the invention also including pin means for securing the principal components in place, showing an order of assembly f e components.
Figure 6A:
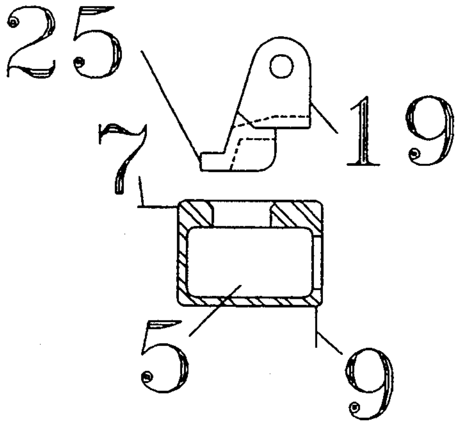
FIG. 6 depicts the manner in which adapter component gripping means of the assembly tool are inserted and secured into position in corner slots of a typical MFP component.
Figure 6B:
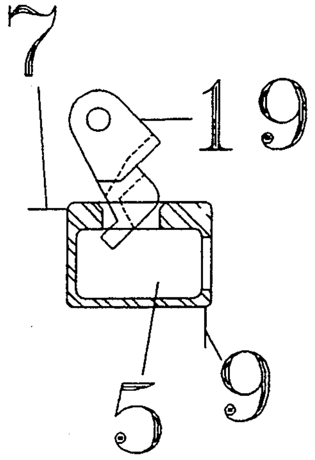
Figure 6C:
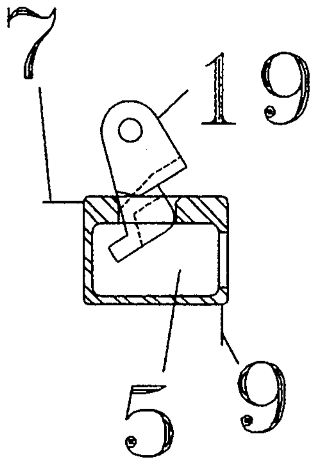
Figure 6D:
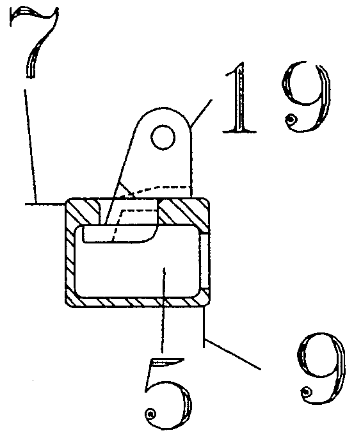

As shown in the drawings (particularly in FIG. 4) the fulcrum lever arm 11 has two ends which have distinct aspects. The lever arm will preferably be a unitary piece, either because it has been cast or machined that way or because the two separate aspects of it have been separately fabricated and then joined together (by welding or similar appropriate means) to form a unitary piece. One aspect is the handle portion 40 the other aspect is the head portion 41 (FIGS. 4, 5). This head portion 41, again as depicted in FIG. 4 especially, proceeds coterminously from the handle portion 40 at its proximal end; it is grooved or slotted the remainder of the way to its distal end, providing the slot 14 shown in FIG. 4. This slot 14 runs longitudinally, substantially the length of the head portion and creates two side members of the head portion. These sides have substantially vertical faces, each face having a substantially identical slot 12. The slots 14 and 12 permit the link rod 17 to pivot on its securing means (depicted as pin Z0 in FIG. 5) and also permit the rod and its securing means to slide translationally along the length of the slots 12 and 14. This translational displacement and pivotal movement of the link rod 17 permitted by slots 12 and 14 allow MFP sections some degree of movement and will minimize shock loading to the tool once the adapters 19 have been properly inserted into the respective corner slots 5 or other coupling means of neighboring MFP sections to be brought into alignment. The slots 12 and 14 also allow for some lack of initial alignment in deck height (i.e., trim) between two MFP sections to be brought into alignment. The hook-like offset of slots 12 toward the distal end of the head portion 41 of fulcrum lever arm 11 allows the tool to lock in its closed position so that it does not have to be held in that position by a crewmember. The movement of link rod 17 in slots 12 and 14 also creates a moving fulcrum point and a varying mechanical advantage along the lenth of the slots.

The means for securing the link rod and adapters to their respective places on the fulcrum lever arm 11 have been described herein and depicted in the drawings as pins 13, 15, 18, and 20 which may be used with cotter pins, washers, or any equivalent hardware that might be useful or desirable. (As depicted in FIG. 5, pins 13 and 15 are identical components together comprising a single securing means). Threaded nuts and bolts along with optional washers could also be employed as securing means. Such hardware is not depicted in any of the drawings. The pins shown and described comprise the preferred means for securing the principal components in place. Threaded nuts and bolts, with optional washers, are deemed to be virtually equivalent securing means in terms of operability and overall desirability. Of course, securing means may be used in mixed combinations (pin means to secure one adapter in one locus and threaded nut means to secure another adapter in another locus, for example), if needed or desired.

Assembly of each tool 2 is relatively easy with the few parts required. Assembly is demonstrated in FIG. 5. The link rod 17 is secured in place at one end in the slots 12 of the lever arm 11 by a rotating pin 20 passed through aperture 34 of the link rod. An adapter 19 is secured to the other end of the link rod 17 by passing pin 18 through aperture 32 in the adapter and aperture 33 in the free end of the link rod 17. A second adapter 19 is secured to the end of the lever arm 11 by passing pin components 13 and 15 through aperture 31 in the lever arm and aperture 30 in the second adapter 19. Once the tool 2 has been assembled, it is typically left in its assembled condition. As noted above, threaded bolts, nuts and optional washers would comprise desirable and fully operational securing means; so would alternative pin means not shown in the drawings. Assembly of the tool would be accomplished in the same manner as described here with the preferred securing means. Whatever securing means are used, the link rod 17 and the adapters 19 must be permitted pivotal movement around the axis of the securing means (pin or bolt, for instance).

Figure 2:
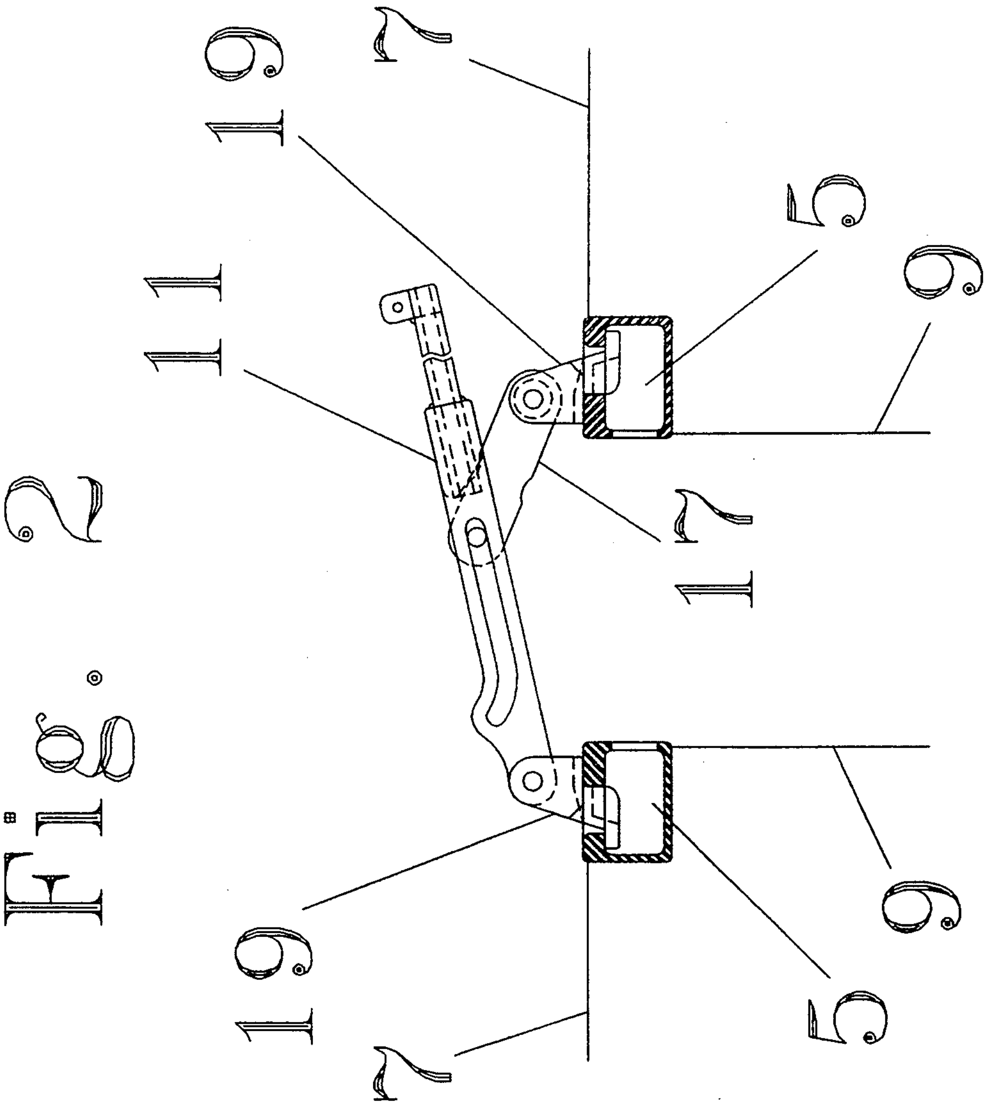
FIG. 2 shows the assembly tool of the invention secured in ready position to bring two MFP sections into alignment.
Figure 3:
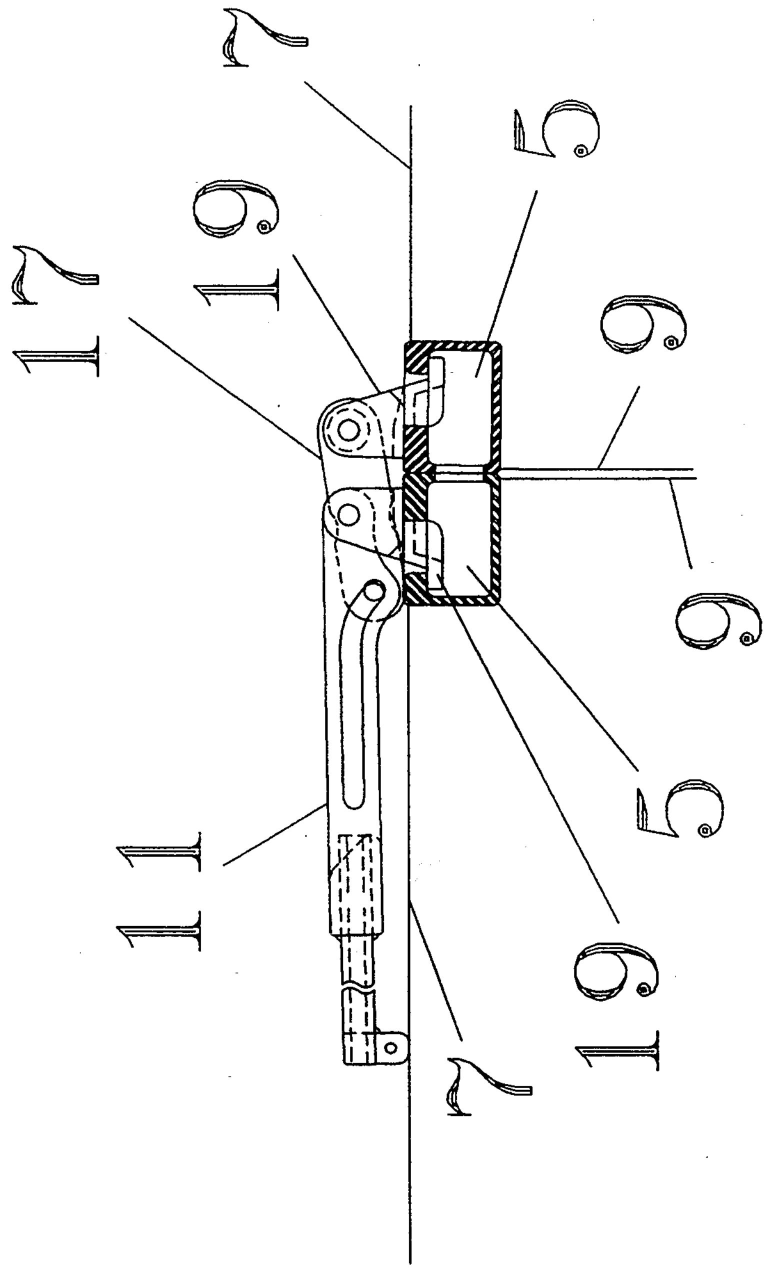
FIG. 3 shows the assembly tool of the invention in its closed (locked) position, i.e., with adjacent MFP sections having been brought into alignment for secure fastening by means independent of the tool.

The manner in which an adapter 19 is placed in position inside a mating corner slot 5 is indicated by the sequential diagrams of FIG. 6. The process is essentially the same for both adapters 19 of a given tool 2, although normally the one secured to the link arm 17 will be put in place first and the other will be put in position after the neighboring MFP section has been brought within reach of the tool to put it in place. The relative placement of two neighboring MFP sections 1 with the assembly tool 2 in place and both adapters 19 in position in their respective corner slots 5 is shown in FIG. 2. The locking position of the tool 2 is shown in FIG. 3. In its closed (locking) position, the tool's fulcrum lever arm is substantially parallel to the deck 7 of the MFP unit and substantially perpendicular to the hull portion 9 of each neighboring MFP section 1.

The assembly tool provides a mechanical advantage in applying force to bring neighboring MFP sections together, especially in the final closing stages of movement (i.e., as the lever arm approaches its closed position as shown in FIG. 5). The magnitude of mechanical advantage may be ascertained by making a ratio of the length of the fulcrum lever arm on the handle side of the fulcrum to the length of fulcrum lever arm on the head side of the fulcrum; the fulcrum is the point at which pin Z0 lies in slots 12. The equation takes the form x/y, in which x is equal to the length of fulcrum lever arm on the handle side of the fulcrum point and y is equal to the length of fulcrum lever arm on the head side of the fulcrum. The expression may be written in the form a:b where a and b are, respectively, the x and y terms of the fractional expression factored to their lowest terms. At the upper extreme of the lever slots 12 closest to the handle portion 40 of the lever, the mechanical advantage is about 3:1 to 5:1; at the other extreme, close to the pivot end of the slots, toward the distal end of the head portion 41, the mechanical advantage is about 12:1 to 18:1, for typically sized assembly tools of the invention.

As noted above, assembly tools will generally be used in pairs; when necessary, more than two may be used to expand the magnitude of applied force. The use of added tools may be required to brine damaged or stubborn modules together. Once the assembly tools have been put in their closed position, separate connecting means of any suitable type may be used to lock the MFP sections together and permit the adapters 19 to be released and removed from their respective corner slots 5. Then the tools may be positioned for the next section-to-section alignment.

The locking capability of the tool of the invention also permits safe and efficient assembly of MFP sections in the dry mode. Currently, dry mode assembly of MFP sections requires close coordination with a crane operator for alignment of small-tolerance heavy loads. Since the assembly tool of the invention will exert much more pulling force than other methods (such as ropes) the assemblers are capable of closer control of the joining and alignment process. Some crane pendulation and wind variables are negated. Typically, dry mode assembly using ropes requires a crewmember to reach between neighboring MFP sections, one of which is suspended from a crane, to secure the pulling ropes. Since corner slots 5 are typically on the deck surface, (espcially for ISO modules), there is no requirement for a crewmember to get between the sections and risk an injury. Differences in crane load trim will be negated by the enhanced pulling power of the assembly tool 2.

Similarly, in the floating mode, neighboring MFP sections may pitch out of trim (i.e., the decks 7 may be of uneven elevation). The enhanced pulling force of the tool 2 can compensate for this irregular flotation. Movement of the handle end of the lever will tend to force down or lift up the edges of neighboring sections to bring them into alignment with each other. Rope assembly of MFP sections in the floating mode has often resulted in damage to the sections, because the sections can bob freely in the water and collide with each other. Shock-absorbing fenders will aid in reducing in-water collision damage to MFP sections. The assembly tool of the invention will aid the positive forces required to pull the floating modules together and will help maintain their relative alignment until they can be locked together, for example, by an integral locking system with which the MFP units may be equipped. Once the assembly tool of the invention has begun to pull the floating modules together the shock-absorbing fenders must be withdrawn prior to closing of the faces of the floating modules.

Although specific embodiments of the invention have been described above with particularity, variations may be made thereto by skilled practitioners of the art without departing from the letter and scope of the claims which follow.

What is claimed is:

1. A tool for manually aligning MFP sections to be joined by means independent of the tool, comprising:

- a fulcrum lever arm having a handle portion and a head portion including slot means running from the proximal end of the head portion near the handle portion to the distal end of the head portion away from the handle portion;
- a link rod secured at one end for pivotal movement and translational displacement inside the slot means of the fulcrum lever arm;
- first gripping means comprising an adapted that makes with standard coupling means provided on standardized MFP sections for engaging coupling means of a first MFP section to be brought into alignment with a second MFP section, secured for pivotal movement to the free end of the link rod, and
- second gripping means comprising an adapted that mates with standard coupling means provided on standardized MFP sections for engaging coupling means of a second MFP section to be brought into alignment with a first MFP section, secured for pivotal movement to the end of the head portion of the fulcrum lever arm; said tool having an open position in which the end of the link rod secured inside the slot means of the fulcrum lever arm is substantially at the extreme proximal end of the slot means, and a closed position in which the secured end of the link rod is substantially at the extreme distal end of the slot means, providing a mechanical advantage which increases from a minimum at the open position to a maximum at the closed position.

2. The tool of claim 1 in which the first and second gripping means further comprise adapters that mate with ISO standard coupling means provided on standardized MFP sections.

3. The tool of claim 1 which provides a mechanical advantage to the operator in the range of from about 3:1 in the open position to about 18:1 in the closed position.

4. The tool of claim 2 which provides a mechanical advantage to the operator in the range of from about 3:1 in the open position to about 18:1 in the closed position.

5. The tool of claim 1 wherein the slot means include means for locking the tool in its closed position.

6. The tool in claim 5, in which the gripping means comprises adapters the mate with ISO standard coupling means provided on standardized MFP sections.

7. The tool of claim 5, which provides a mechanical advantage to the operator in the range of from about 3:1 in the open position to about 18:1 in the closed position.

8. The tool of claim 6, which provides a mechanical advantage to the operator in the range of from about 3:1 in its open position to about 18:1 in its closed position.

9. The tool manually aligning MFP sections to be joined by means independent of the tool, comprising:

- a fulcrum lever arm having a handle portion and a head position, said head portion including first slot means running longitudinally from the proximal end of the head portion near the handle portion to the distal end of the head portion away the handle portion creating two substantially parallel side members of the head portion, each side member having substantially identical second slot means therein running from the proximal end of each side member near the handle portion of the lever arm to the distal end of each side member away from the handle portion;
- a link rode secured at one end for pivotal movement and translational displacement inside the first and second slot means of the head portion of the fulcrum lever arm;
- first gripping means comprising adapters the mate with standard coupling means provided on standardized MFP sections for engaging coupling means of a first MFP section to be brought into alignment with a second MFP section, secured for pivotal movement to the free end of the link rod; and
- second gripping means comprising adapters that mate with standard coupling means provided on standardized MFP sections for engaging coupling means of the second MFP section to be brought into alignment with the first MFP section, secured for pivotal movement to the end of the head portion of the fulcrum lever arm; said tool having an open position in which the end of the link rod secured inside the first and second slot means of the head portion of the fulcrum lever arm is substantially at the extreme proximal end of said slot means nearest the handle portion of the fulcrum lever arm, and a closed position in which the secured end of the link rod is substantially at the extreme distal end of the said slot means, farthest away from the handle portion of the fulcrum lever arm, providing a mechanical advantage which increases from a minimum at the open position to a maximum at the closed position.

10. The tool of claim 9 wherein the second slot means include means for locking the tool in its closed position.

11. The tool of claim 9 in which the first and second gripping means comprises adapters that mate with standard coupling means provided on standardized MFP sections.

12. The tool of claim 9 in which the first and second gripping means further comprises adapters that mate with ISO standard coupling means provided on standardized MFP sections.

13. The tool of claim 10 in which the first and second gripping means further comprises adapters that mate with ISO standard coupling means provided on standardized MFP sections.

14. The tool of claim 10 which provides a mechanical advantage to the operator in the range of from about 3:1 in the open position to about 18:1 in the closed position.

15. The tool of claim 13 which provides a mechanical advantage to the operator in the range of from about 3:1 in its open position to about 18:1 in its closed position.

* * * * *

UNITED STATES PATENT AND TRADEMARK OFFICE

CERTIFICATE OF CORRECTION

PATENT NO. : 5,437,084

DATED : August 1, 1995

INVENTOR(S) : Stephen C. Woolery

It is certified that error appears in the above-indentified patent and that said Letters Patent is hereby corrected as shown below:

In Column 1, Line 7 change "practice" to --practiced--.

In Column 2, Line 63 change "off, he" to --of the--.

In Column 3, Line 1 change "f e" to --for the--.

In Column 4, Line 63 change "assemble17" to --assembly--.

In Column 5, Line 19 change "Z0" to --20--.

In Column 6, Line 36 change "Z0" to --20--.

In Column 6, Line 52 change "brine" to --bring--.

In Column 7, Line 47 change "adapted" to --adapter--.

In Column 7, Line 48 change "makes" to --mates--.

UNITED STATES PATENT AND TRADEMARK OFFICE

CERTIFICATE OF CORRECTION

PATENT NO. : 5,437,084

DATED : August 1, 1995

INVENTOR(S) : Stephen C. Woolery

It is certified that error appears in the above-indentified patent and that said Letters Patent is hereby corrected as shown below:

In Column 7, Line 54 change "adapted" to --adapter--.

In Column 8, Line 13 change the first occurrence of "in" to --of--.

In Column 8, Line 22 change "The tool manually" to --A tool for manually--.

In Column 8, Line 25 change "position" to --portion--.

In Column 8, Line 37 change "rode" to --rod--.

In Column 8, Line 41 change "the" to --that--.

Signed and Sealed this

Twenty-fourth Day of October, 1995

Attest:

Bruce Lehman

BRUCE LEHMAN

*Attesting Officer* *Commissioner of Patents and Trademarks*